United States Patent [19]
Whisenant

[11] Patent Number: 5,193,306
[45] Date of Patent: Mar. 16, 1993

[54] PLANT CULTIVATION APPARATUS AND METHOD

[76] Inventor: Blake Whisenant, P.O. Box 207 - Hwy. 62, Parrish, Fla. 34219

[21] Appl. No.: 546,448

[22] Filed: Jul. 2, 1990

[51] Int. Cl.$^5$ ............................................. A01G 27/00
[52] U.S. Cl. ......................................... 47/81; 47/59; 47/62
[58] Field of Search ...................... 47/59, 62, 79, 80, 81

[56] References Cited

U.S. PATENT DOCUMENTS

| | | | |
|---|---|---|---|
| 1,533,342 | 4/1925 | Schein | 47/79 |
| 1,789,994 | 1/1931 | Wittbold | |
| 2,081,337 | 5/1937 | Lockyer | 47/81 |
| 2,870,574 | 1/1959 | Sheridan | 47/62 |
| 3,613,309 | 10/1971 | Coburn | |
| 3,775,903 | 12/1973 | Pike | |
| 3,821,863 | 7/1974 | Chan | |
| 3,987,584 | 10/1976 | Yellin | |
| 4,014,135 | 3/1977 | Greenbaum | |
| 4,121,608 | 10/1978 | MacLeod | |
| 4,133,141 | 1/1979 | Lee | |
| 4,161,844 | 7/1979 | Hentschel et al. | |
| 4,209,945 | 7/1980 | Dent et al. | |
| 4,454,684 | 6/1984 | O'Hare | |
| 4,545,145 | 10/1985 | Torrance et al. | |
| 5,107,621 | 4/1992 | Deutschmann, Sr. | 47/79 |

FOREIGN PATENT DOCUMENTS 2198324  6/1988  United Kingdom ................. 47/79

Primary Examiner—Richard E. Chilcot, Jr.
Assistant Examiner—Joanne C. Downs
Attorney, Agent, or Firm—Cushman, Darby & Cushman

[57] ABSTRACT

An apparatus and method for conserving water and reducing labor in growing plants, particularly commercially grown tomatoes and cucumbers. The invention includes a reservoir container assembly and an arch support structure. The reservoir container assembly comprises a reservoir container capable of holding water as well as a bag container disposed on top of the reservoir container for holding a plant growing medium. Water in the reservoir container is connected via a hydroscopic medium to the growing medium inside the bag container. The top surface of the bag container is provided with at least two openings. A plant grows through one opening, and evaporation takes place through a second remote opening. In use, a plurality of such reservoir container assemblies may be disposed in a line in a field and a series of arch support structures disposed between them. The plants which grow out of the bag containers and over the arch support structure are thereby supported off the ground. Plants grown in this way do not need to be manually tied to any support structure. They are easily tended, weeded, sprayed and picked.

33 Claims, 4 Drawing Sheets

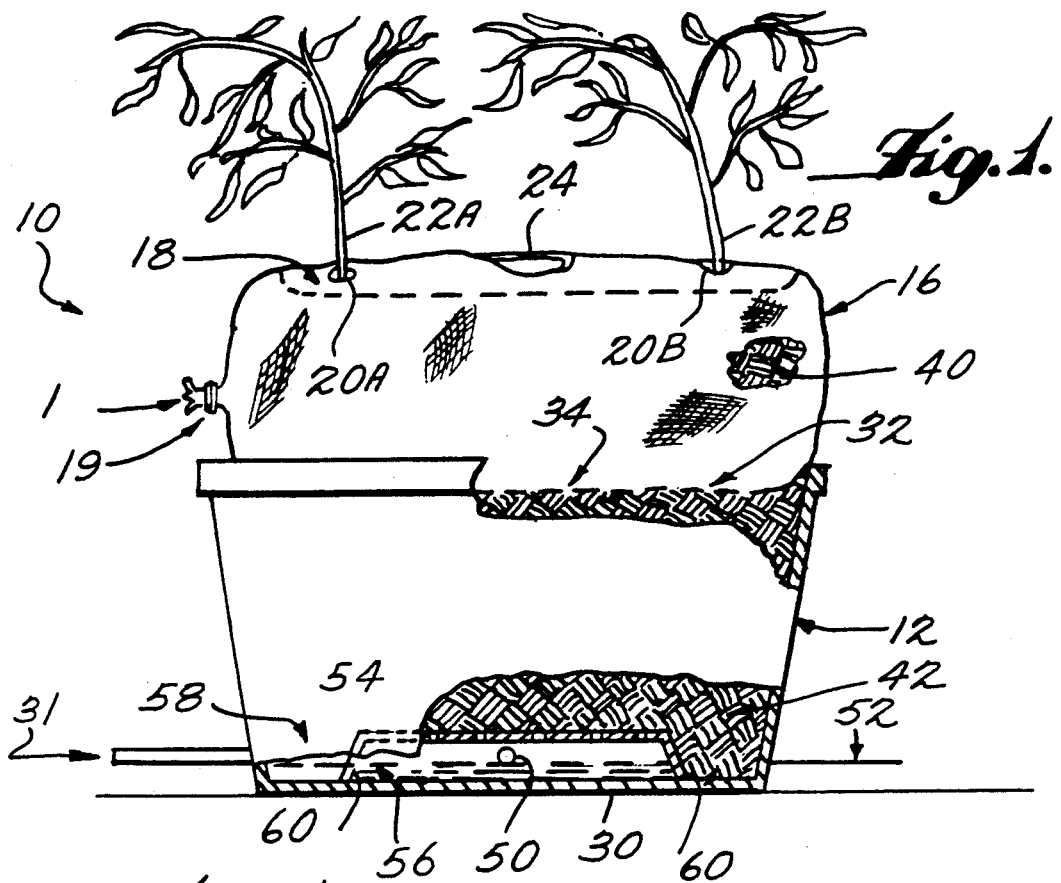

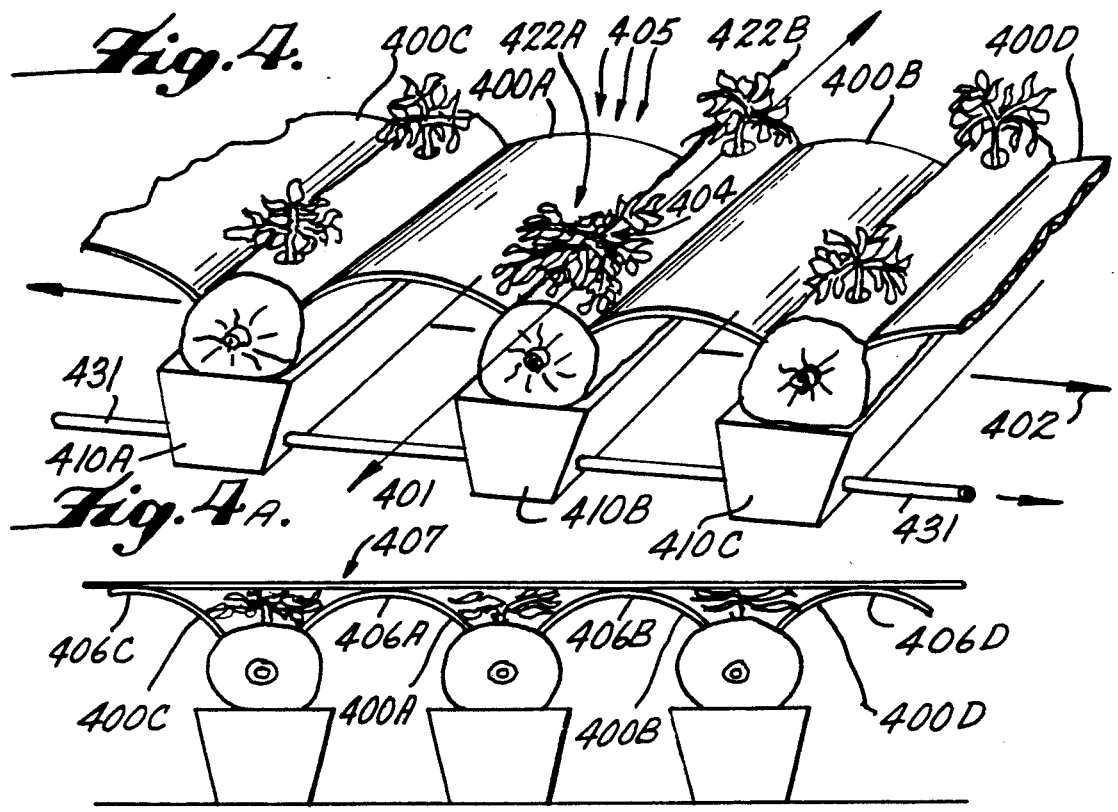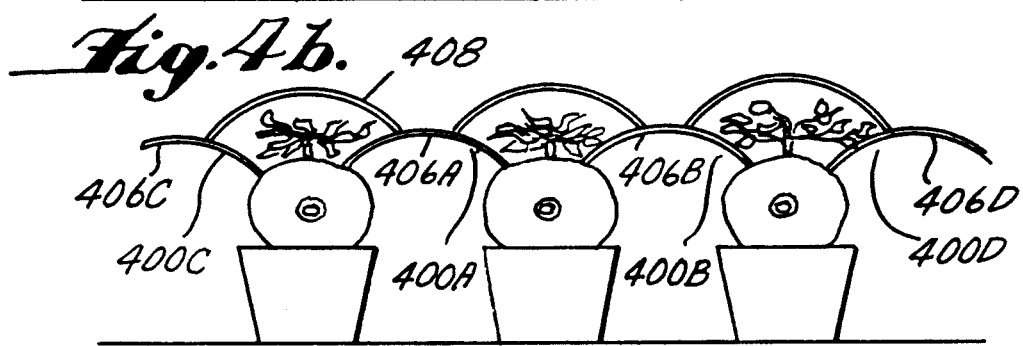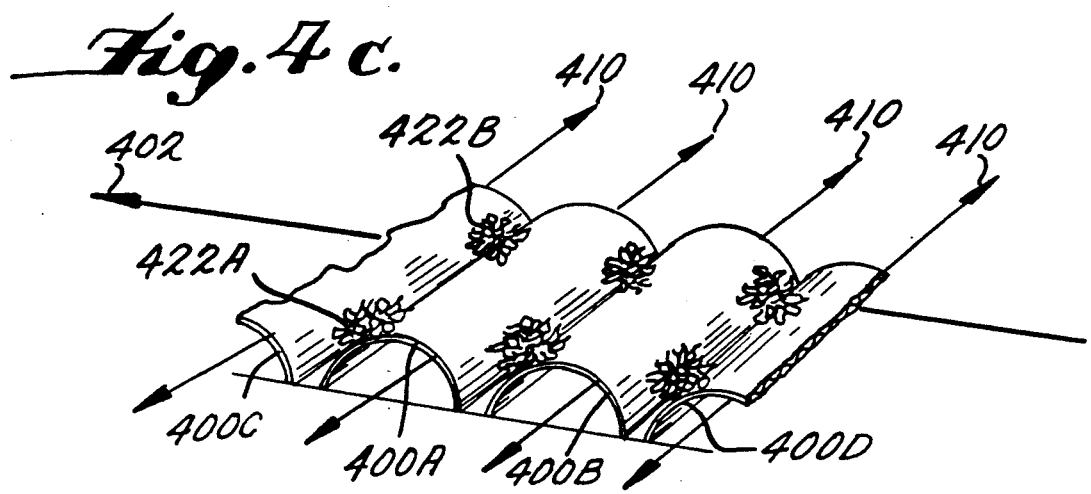

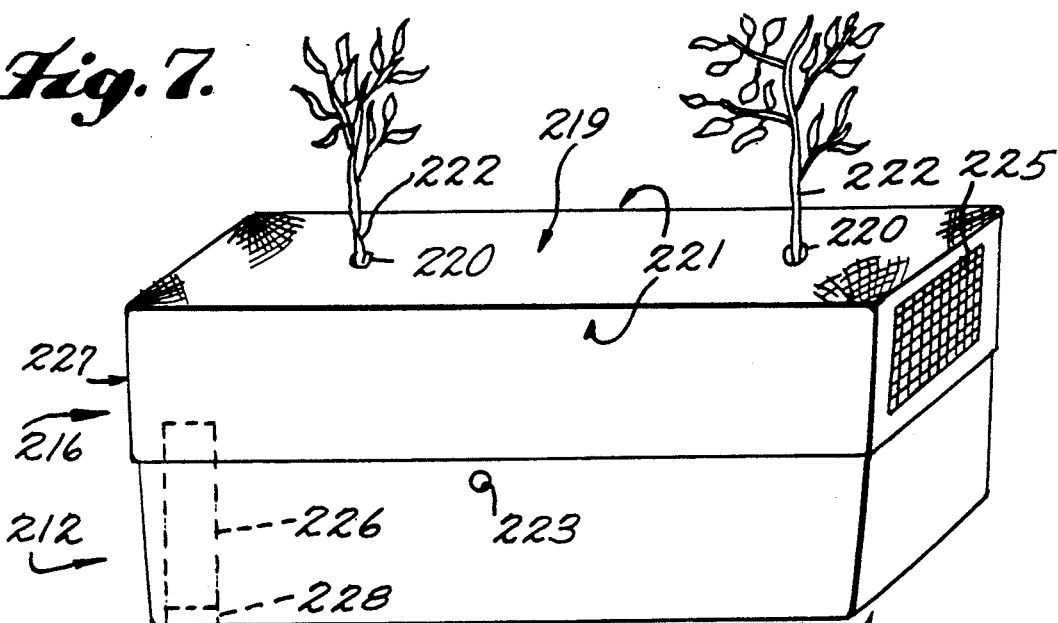
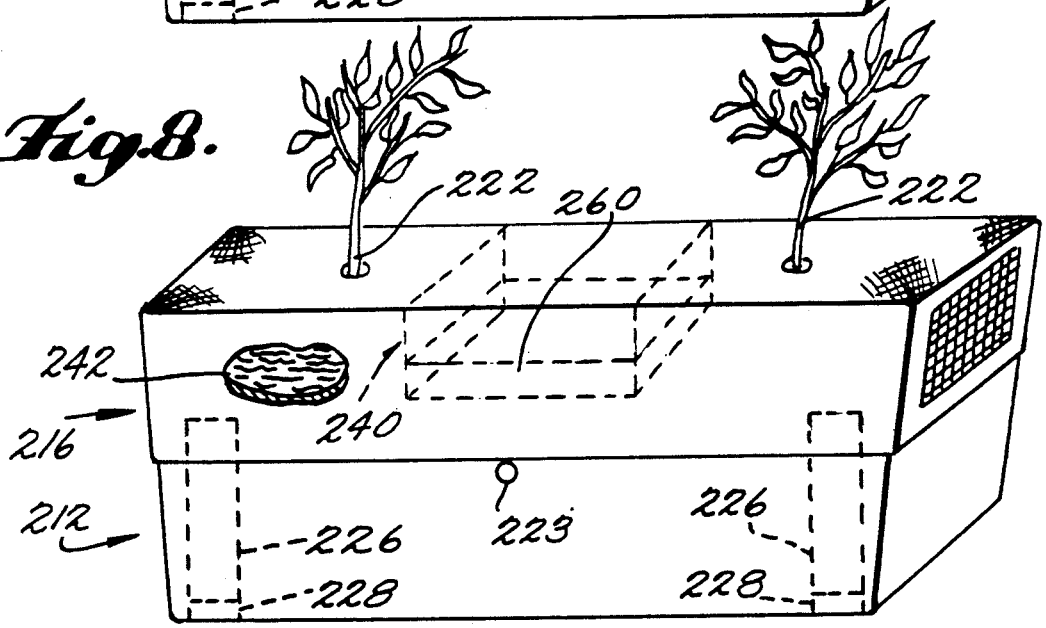
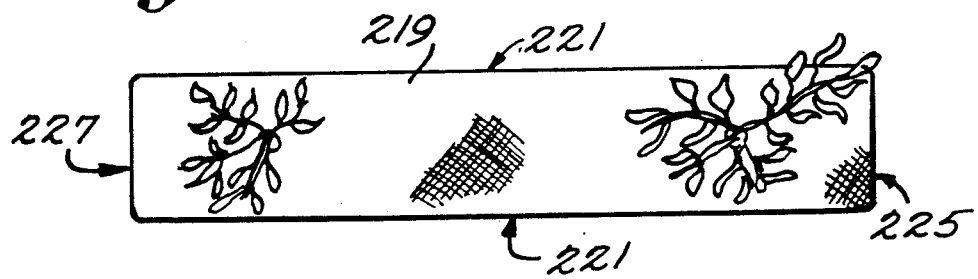

5,193,306

PLANT CULTIVATION APPARATUS AND METHOD

FIELD OF THE INVENTION

The present invention relates to a cultivation apparatus and method which greatly minimizes the quantity of water and amount of labor required to grow plants to maturity. In particular, the invention relates to a water efficient and labor efficient apparatus and method for commercially growing tomatoes.

BACKGROUND OF THE INVENTION

In the cultivation of various plant species, numerous structures for housing a growing medium have been proposed to enable the grower to closely control the quantity of water supplied to the roots of the plant as well as to maintain the integrity of the growing medium. In general, these structures have involved a container for the growing medium together with an irrigation system for supplying water and other nutrients to the growing medium in the container. As compared to the natural cultivation of plant species directly in the ground, the use of such growing containers has not met with widespread acceptance due to the expense of the container and due to the rapid depletion of the nutrients in the growing medium employed.

These prior growing containers have also suffered the severe disadvantage of promoting the growth of undesirable parasites and fungi due to confinement of the growing medium in the containers. In addition, salt and mineral accumulation resulting from localized evaporation from the container has resulted in stunted plant growth or death of the plant. The only known solution to this detrimental mineral buildup has involved a significant investment in labor for attending to the condition of the soil in the container during the growing period. Accordingly, the disadvantages of such prior art growing containers have offset any advantages realized by their use.

Furthermore, the current production of produce for human consumption involves a significant amount of labor. The developing fruit of the plant must be kept off the ground to prevent the fruit from rotting and to allow sunlight to reach the fruit. In a common method for growing tomatoes, for example, individual tomato plants are planted in rows. At significant cost, stakes are then driven between successive tomato plants in the row. Wire is then strung between the stakes so that as the tomato plants grow, they can be tied to the wire/-stake structure. This tieing of the plants, of course, also involves labor. Then, after picking, the plants must be cut from the stake structure, the wire removed, and the stakes pulled before the soil can be tilled. Then after tilling, the stakes must again be driven and the wire restrung. Despite the fact that presently employed growing staking apparatuses and methods are so labor intensive, staking is nevertheless carried out because cost effective and workable alternatives have not yet been developed.

SUMMARY OF THE INVENTION

The present invention provides an improved apparatus and method which avoids the problems inherent in the prior art and provides a cultivation system which will produce superior plant growth with a low labor cost. The present invention significantly reduces the quantity of water lost through evaporation, does not require disposal of the growing medium after each growing season, assures that salt does not accumulate around the plant's roots, and provides for the inexpensive and efficient picking and tending of the resultant plants.

In the preferred embodiment, the present invention provides a flexible bag container with a top surface and a bottom surface. This bag container contains a growing medium. First and second plant seeds or striplings are embedded beneath first and second openings provided in the top surface of the bag container. A third opening in the bag container serves as an evaporation opening or vent so that excess water supplied to the interior of the bag container can escape. The bag container is then disposed directly on the surface of a volume of hydroscopic medium. This hydroscopic medium is held by a water reservoir container which has an open top. Because the bottom surface of the bag container is provided with perforations, water in the bottom of the reservoir container is drawn up to the surface of the hydroscopic medium, through the perforations in the bottom surface of the bag container, and into the growing medium inside the bag container. The growing plants are therefore continuously supplied with moisture from water in the reservoir container.

According to the preferred method of using the preferred embodiment, the opening about the plant's stem is kept as small as possible to prevent or at least to minimize evaporation of water at this site. Maintaining the tight fit is easily effected by making the opening sufficiently small so that, as the stem increases in diameter, stem contact with the peripheral edge of the opening is maintained.

With this arrangement, the reservoir container assembly of the present invention may be left unattended for several days because the reservoir will continuously supply the required amount of moisture to the growing medium and because salt deposits from evaporation will be maintained at the third opening remote from plant's roots. Also, to compliment the water savings of the present invention, an arch support structure is provided to reduce labor costs associated with the developing plant. This arch support structure may be made of a rectangular piece of open mesh material. This square piece is, however, arched upward in one dimension to form an arch structure, complete with two downward pointing supporting portions.

According to the preferred method of use, the water reservoir assembly and the arch structure are used together. A number of the water reservoir container assemblies are first disposed in the field at an even spacing so that they form a line. The first and second openings of each reservoir container assembly are aligned to be perpendicular to the line of reservoir container assemblies. A number of arch support structures are then laid on the line of reservoir container assemblies so that a different arch structure spans the area between successive reservoir containers in the line. The supporting portions of the arch structures are made to rest on the bag containers so that none of the first and second openings are covered by an arch structure. Due to this configuration of the reservoir container assembly and the arch support structure, the plants which develop from the first and second openings grow over the arch structure and are thereby prevented from contacting the ground.

Because individual plants rest on the arch structures and are separated from the ground, the labor intensive tieing of plants to a structure is not required. Weeding of the field is also easily accomplished because the area underneath the arch structures is always readily accessible. Very importantly, a tomato plant growing on such an arch support structure will grow so that it is spread open from the top at its branching fork. Sunlight therefore penetrates the plant, the fruit ripens in the sun, and the exposed ripened fruit is easily seen and picked.

Upon completion of a growing cycle, the plants are easily removed from their supporting structure because they are not tied to anything. Because the arch support structures merely rest on the bag structures, the arch structures are easily pulled away from the reservoir container assemblies. Additionally, the growing medium in the bag container is readily removed from the bag for restoration of needed nutrients. The growing medium can thereafter be reused. Additionally, the hydroscopic medium in the water reservoir container can be fumigated to kill undesirable parasites and fungi which may have begun to grow in the container. Accordingly, the hydroscopic medium is also reused.

BRIEF DESCRIPTION OF THE DRAWINGS

The foregoing and other advantages will become apparent as consideration is given to the following detailed description taken in conjunction with the accompanying drawings, in which:

FIG. 1 is a front view of the preferred embodiment of the reservoir container assembly of the present invention;

FIG. 2 is a view of the preferred embodiment similar to the view of FIG. 1 except that FIG. 2 shows the bag container removed to display the bottom surface of the bag container and the top surface of the hydroscopic medium in the water reservoir container;

FIG. 3 is a perspective view of the arch support structure of the present invention;

FIG. 4 is a view showing the preferred method of using the arch support structure in combination with the preferred embodiment of the reservoir container assembly;

FIG. 4A shows a continuous sheet of material which is unrolled over a line of reservoir container assemblies to protect plants from frost;

FIG. 4B shows a series of solid arch shaped structures disposed on top of a line of reservoir container assemblies to protect the plants from frost;

FIG. 4C depicts the arch support structure employed without the reservoir container structure;

FIG. 7 is a front view of the third embodiment of the present invention in which a box container replaces the bag container;

FIG. 8 is a front view of a modification of the third embodiment of the present invention; and FIG. 9 is a top plan view of a box container usable with the third embodiment of the present invention.

DETAILED DESCRIPTION OF THE INVENTION PREFERRED EMBODIMENT

Figure 5:
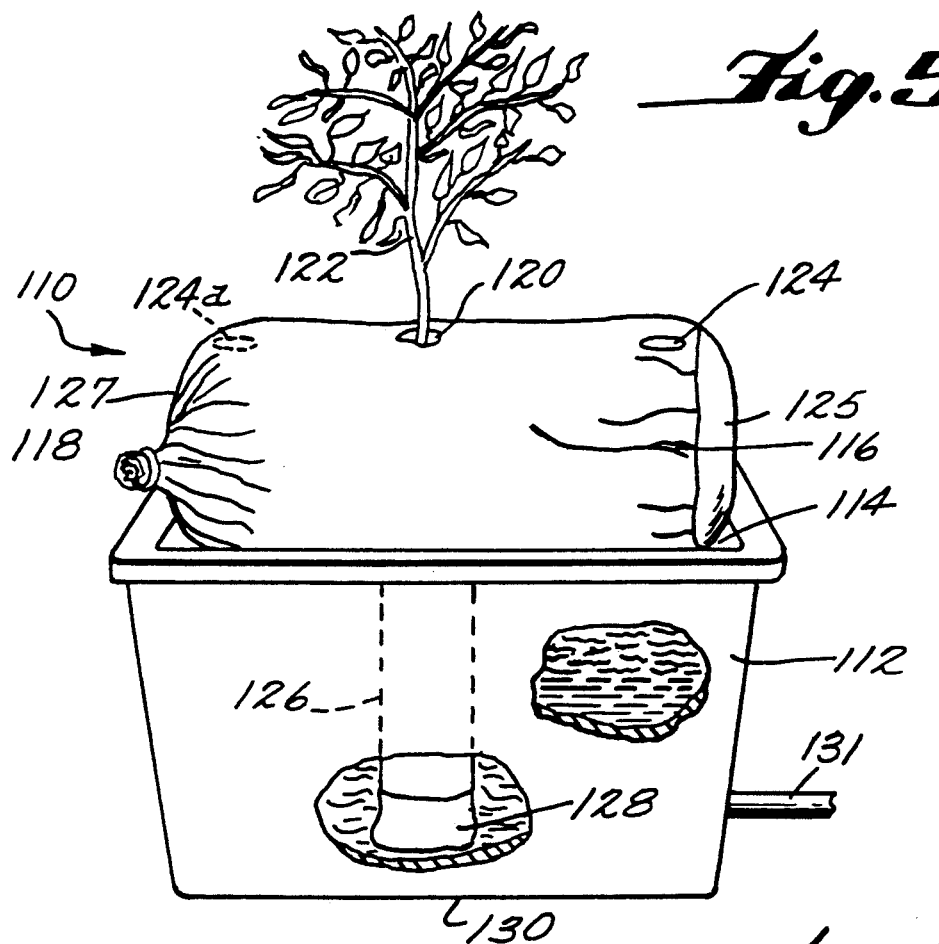
FIG. 5 is a front view of the second embodiment of the cultivation system of the present invention.

In the drawings, like numerals designate corresponding parts throughout the several views. FIGS. 1 and 2 show the preferred embodiment of the water reservoir container assembly of the present invention. The preferred embodiment is composed of two primary parts, a bag container 16 and a water reservoir container 12.

As shown in FIG. 1, the water reservoir container 12 is filled with a hydroscopic medium 42. The bag container 16 is disposed directly on top of the hydroscopic medium in the water reservoir container so that the bag container completely covers the top surface of hydroscopic medium inside the reservoir container.

It is the bag container 16 itself which is filled with the growing medium 40, such as soil, in which two plants 22A, 22B are grown. This soil may be mixed with a number of different nutrients depending upon the type of plant to be cultivated. The first plant 22A grows from a first opening 20A in the top surface 18 of bag container 16, whereas the second plant 22B grows from a second opening 20B in the top surface 18 of bag container 16. In FIG. 1, the first opening 20A is shown to be located in the top surface 18 at one end of the oblong bag container 16. The second opening 20B is shown to be located at the other end of the bag container 16.

In addition to the first and second openings, the top surface of the bag container also contains a third opening 24. This third opening facilitates the evaporation of excess moisture which may be present inside the bag container 16. The third opening 24 is located at a site remote from both the first and second openings 20A, 20B. Accordingly, salt and minerals which build up at the site of evaporation are kept away from the roots of developing plants 22A, 22B.

As shown in FIG. 1, the reservoir container has drain hole 50 located in its sidewall near the bottom 30 of the water reservoir container 12. Accordingly, when water is poured into the reservoir container, excess water drains from the drain hole 50 until the volume of standing water in the reservoir container is such that the level of water in the reservoir is greater than the fill and drain water level 52.

In addition, the reservoir container 12 is provided with a permeable partition 54 which separates a drain volume 56 inside the water reservoir container from a hydroscopic medium volume 58 inside the water reservoir container. The drain volume 56 contains little if any hydroscopic medium whereas the hydroscopic medium volume 58 is filled with hydroscopic medium 42. When water is present in the bottom of the reservoir container, water is drawn through the immersed portions 60 of the permeable partition 54 and into the hydroscopic medium 42. Accordingly, as plants 22A, 22B grow, as water evaporates from the third opening 24, and as moisture is depleted from the bag container 16, moisture is continuously supplied to the bag container 16 through the permeable partition 54, the hydroscopic medium 42 in the reservoir container 12, and the perforations 34 in the bottom surface 32 of the bag container 16. In some applications, the reservoir assembly has a water supply line 31 which periodically supplies the reservoir container with water.

The bag container 16 shown in FIG. 1 is fashioned from a flexible bag, such as a common garbage bag, made of a water impervious material. Bags made of polyethylene film have proven successful in experimental growing. The flexible bag container may be filled with the plant growing medium 40 through the open end 18 of bag 16. The flexible material around the open end of the filled bag may then be bunched together and secured by a wire, staple, or the like 19.

The hydroscopic medium 42 used in the water reservoir container 12 may comprise sand, rock wool, common soil, or a combination of these materials. Common soil has been found to be the most effective and common soil is therefore depicted in the preferred embodiment of FIGS. 1 and 2.

To use the reservoir container assembly, the user deposits seed material immediately vertically below the first and second openings 20A, 20B to an appropriate depth depending on the type of plant to be grown. In the case of striplings, the striplings are planted to the appropriate depth through the openings. After sufficient growth of the stems 22A, 22B through the first and second openings 20A, 20B, the user reduces the size of the openings by manually adjusting their sizes about the plant stems. An alternative to manual adjustment is the addition of an auxiliary section of sheet material which is inserted through the openings to surround the stems 22A, 22B.

ARCH SUPPORT STRUCTURE

FIG. 3 shows the preferred embodiment of the arch support structure 400 of the present invention. In this embodiment, the arch support structure 400 is made in the shape of an arch, complete with two supporting portions 401A, 401B. Although the material from which these arches is made may either be a solid or an open mesh, a mesh is preferred to reduce the cost of the arch support structure as well as to facilitate herbicide and pesticide spraying through the arch support structure. When the plant is not being sprayed, an open mesh also facilitates the air flow through the plant and around the fruit.

Reducing the cost of this arch support structure 400 is of critical importance to the economic viability of this invention. Accordingly, it is anticipated that high volume, low unit cost production of the arch support structure 400 will be possible. It is also conceivable that inexpensive arch support structures could be made of a durable plastic mesh from recycled milk containers. Alternatively, a wire mesh or a plastic coated wire mesh material may be employed.

As is apparent, the arch support structure 400 can assume a form other than that of an arch. Any form which will have adequate strength to support the weight of the plants above the surface of the soil can be used. The presently disclosed arch shape is deemed to provide a reasonably strong and stable structure for the amount of mesh material required in its construction.

FIG. 4 depicts the use of the arch support structure 400 in combination with the use of the preferred embodiment 10 of the reservoir container assembly. In FIG. 4, three reservoir container assemblies 410A, 410B, 410C are shown as well as two arch support structures 400A, 400B. The left most 410A and right most 410C reservoir container assembly are depicted attached to portions of two additional arch support structures 400C, 400D. This illustrates that the reservoir structures 410A, 410B, 410C are part of a long line of reservoir structures and that a different arch structure is disposed in between successive reservoir container assemblies in the line. Each of the reservoir container structures is oriented so that axis 401 containing first and second openings 422A, 422B is substantially perpendicular to the line 402 of reservoir container assemblies. A single water supply line 431 may also extend through all the container assemblies in the line.

In this preferred use of the reservoir container assembly and the arch support structure 400, two plants grow in each bag structure of each reservoir container assembly. In FIG. 4, the depicted plants are tomatoes plants, each of which has a branching fork 404. The plants therefore are opened from the top by this branching fork 404 and sunlight, depicted here as rays 405, penetrates the central portion of each of the plants. Weeding, spraying, pruning, and picking of the plants is therefore easily accomplished from either side of the line of reservoir container assemblies.

An additional advantage of the arch support structure 400 of the present invention is that the plants can be quickly and easily frost protected. As shown in FIG. 4, the plants, especially when they are small, are primarily located beneath the apexes 406C, 406A, 406B, 406D of the arch structures 400C, 400A, 400B, 400D. A covering can therefore be placed over the entire arch support structure in times of impending frost and the weight of the covering will be supported by the arch structure. This covering may take the form of a continuous sheet of material 407, a solid arch shaped structure 408, or any suitable protective material. FIG. 4A shows a line of reservoir container assemblies protected from the frost by a continuous sheet of material 407 which has been unrolled over the line. FIG. 4B shows a line of reservoir container assemblies protected from the frost by a series of solid arch shaped structures 408.

As depicted in FIG. 4C, the arch support structure 400 may also be employed independently from the reservoir container assembly. Pairs of individual tomato plants (plants 422A and 422B constitute a pair) are first planted or grown by seed directly in the soil. The pairs of plants are planted so that each pair is aligned perpendicularly to the line of pairs 402. Spacing along line 402 between successive pairs of plants is slightly larger than the breadth 411 of arch structure 400. Next, a plurality of arch structures are placed along the line 402 so that the axes 410 of each arch structure is aligned substantially perpendicular to line 402. One arch support structure is placed between successive tomato plant pairs so that the maturing tomato plants can grow over the arch structures. Apart from the water consumption benefits, the configuration of FIG. 4C provides many of the benefits realized with the embodiment of FIG. 4 including easy and inexpensive tending, spraying, ripening, and picking.

SECOND EMBODIMENT

Figure 6:
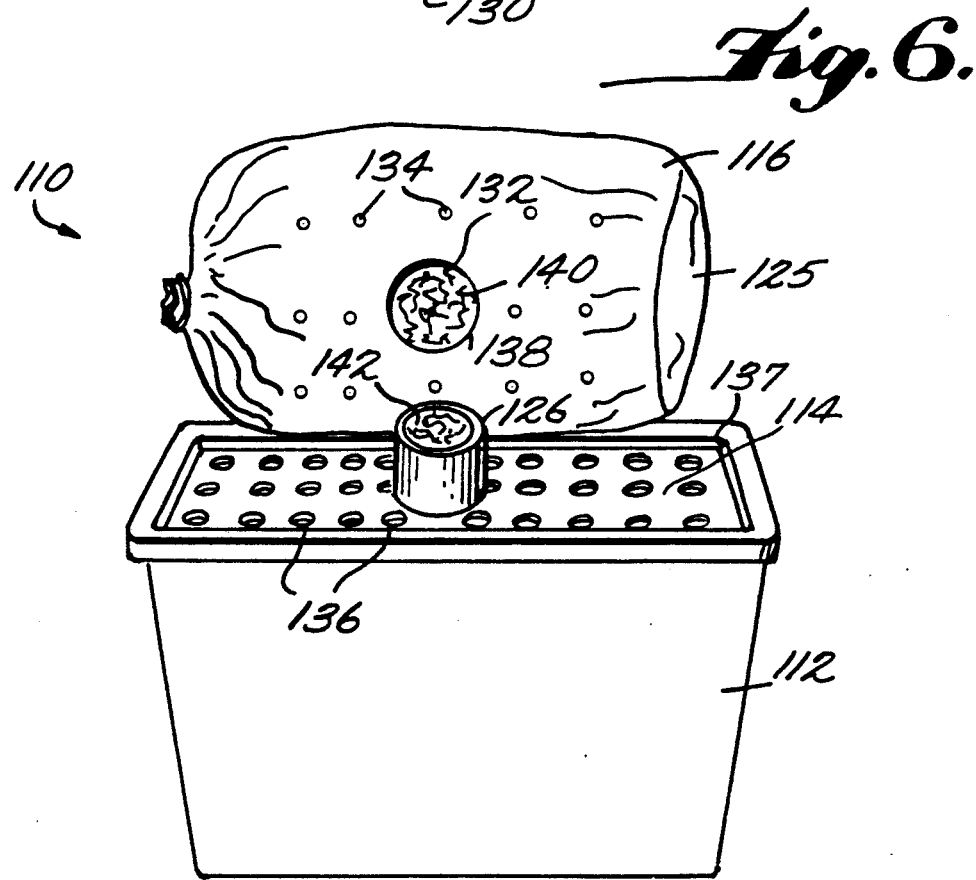
FIG. 6 is a view similar to FIG. 3 but showing the bag container removed to display its bottom surface and to display the top surface of the water reservoir container.

FIGS. 5 and 6 show a second embodiment of the reservoir container assembly 110 of the present invention. This embodiment can also be used in combination with the arch shaped support structure of FIG. 3. In FIGS. 5 and 6, reference numerals corresponding to the elements of FIG. 1 and 2 are employed raised by 100.

As shown in FIGS. 5 and 6, second embodiment 110 includes a reservoir container 112 and a bag container 116. As in the preferred embodiment, container 116 contains a plant growing medium. The top surface of bag 116 is provided with an opening 120 through which a plant stem 122 extends as the plant increases in size. A separate opening 124 is spaced remotely from opening 120. Second opening 124 is provided to facilitate evaporation of excess moisture that accumulates in the interior of bag 116. As in the preferred embodiment, leaching of minerals that are unfavorable to plant growth occurs at a site in the bag remote from the developing roots of the plant 122. If desired, opening 124 can be placed in the opposite walls 127 or 125 or both walls of bag 116.

In this second embodiment, however, moisture is supplied to the interior of bag 116 through conduit 126. This conduit 126 extends upwardly through an opening in the top wall 14 of the reservoir container 112. As illustrated, conduit 126 has its lower end disposed adjacent to bottom wall 130 of reservoir container 112. The bottom end of conduit 126 is spaced a small distance from bottom surface 130 and may be enclosed in a water permeable sheath 128. This sheath is provided to serve as a filter for a number of possible water contaminants and also to serve as a means for retaining hydroscopic medium 142. As shown in FIG. 6, the hydroscopic medium 142 is deposited in conduit 126 preferably up to its upper end. The conduit 126 filled with the hydroscopic medium 142 then protrudes through the top wall 114 of the reservoir container a selected distance.

As shown in FIG. 6, bottom surface 132 of bag 116 is provided with an opening 138 which will closely interfit about the exterior of conduit 126 so that when opening 138 is placed over the upper end of conduit 126, the plant growing medium 140 comes into intimate contact with the hydroscopic medium 142 filling conduit 126. By proper selection of the hydroscopic medium, the foregoing arrangement assures transmission of moisture from the reservoir to the plant growing medium 140 filling bag container 116. It has been found that by filling conduit 126 with sand, rock wool, or a mixture of these materials, adequate moisture is provided.

In certain circumstances, it may be useful to provide drainage to bag 116. For this purpose, bottom 132 of the bag is provided with a number of perforations 134. In addition, upper wall 114 of container 112 is also provided with perforations 136. Accordingly, excess moisture from bag 116 can drain through perforations 134 in bag 116, through perforations 136 in the upper wall of container 112, and into reservoir container 112. Reservoir container 112 depicted in FIGS. 1 and 2 also has a recessed shoulder 137 for insuring that excess moisture which drains from bag 116 is returned through openings 136 to reservoir container 112.

Because opening 124 is of larger surface area than is opening 120, leaching of minerals takes place substantially in the vicinity of opening 124 and not in the vicinity of opening 120 through which plant growth occurs. By using a flexible rim for opening 120, the edge of the opening is maintained in intimate contact with the stem growing therethrough. As a result, evaporation of water through opening 120 is minimized. A second evaporation opening 124a indicated in broken lines may also be provided adjacent to the opposite end wall 127 of bag 116. Preferably, each of the openings 124 and 124a are equidistantly spaced along the longitudinal axis of bag 116 from opening 120. The location of opening 120 relative to the upper surface of bag 16 is, of course, arbitrary. The only limitation that must be observed is that opening 120 be spaced a suitable distance from each of the evaporation openings. In some circumstances, such as where large plant growths are contemplated, a water supply is conveniently attached to reservoir container 112 by a water supply line 131.

THIRD EMBODIMENT

FIGS. 7-9 show a third embodiment of the reservoir container assembly of the present invention. This embodiment can also be used in combination with the arch shaped support structure 400 of FIG. 3. In FIGS. 7-9, reference numerals corresponding to the elements of FIGS. 1 and 2 are employed raised by 200.

According to this third embodiment, a rigid box 216 replaces the flexible bag as bag container 16. End walls 225 and 227 of box 216 are formed of screen mesh through which evaporation and the leaching of undesirable minerals takes place. Top wall 219 of box 216 may be open whereas opposing side walls 221 are made of rigid plastic or wood plank material. Top wall 219 of the box container 216 is covered by a sheet of plastic film having openings 220 therein for plant growth 222. The reservoir container 212 has a sidewall provided with a water supply opening 223. Conduit 226 with its filtering cap 228 functions substantially as described above in connection with the second embodiment.

As shown in FIG. 8, this embodiment may also involve two separate conduits 226. Having two conduits 226 helps provide even distribution of moisture from the reservoir container 212 into the upper box container 216. A wire mesh receptacle 240 may be provided in the plant growing medium on the interior of box container 216 for separating a fertilizing medium 260 from the plant growing medium 242. Wire mesh receptacle 240 also serves to separate the fertilizer from the roots of growing plant 222.

As shown in FIG. 9, top wall 219 of box container 219 may be a screen mesh. This mesh is subsequently covered with a protective film during the growing period to prevent evaporation. This construction results in both flexibility in seeding/planting as well as assurance that evaporation takes place remote from the growing roots.

Regardless of whether the preferred embodiment, the second embodiment, or the third embodiment is used, the entire contents of bag container 16, 116 or box container 216 may be removed after the completion of the growing season. The removed container with the growing medium can then be submerged in water for a period of time to kill off any accumulated fungi or parasites. The growing medium can also be fumigated to rid the growing medium of undesirable pests. Then, subsequent to the submersion and/or fumigation, suitable nutrients can be added to the sterilized medium. Accordingly, the necessity for removing the plant growing medium from containers 16 or 216 is avoided.

As described above, the use of the reservoir container assembly of the present invention results in substantial savings in the amount of water required for healthy plant growth compared to prior art systems in which free drainage of water from the growing container is permitted. Very importantly, the cultivation system of the present invention simultaneously reduces the amount of water and the amount of labor required to produce vegetables such as tomatoes. Furthermore, due to the fact that both the reservoir container assembly and the arch support structure are reusable, the initial cost of the system can be recouped over time. Accordingly, an economically advantageous and water conserving system which requires little labor to operate is disclosed. In view of the invention described above, it will be apparent to those skilled in this art that various modifications may be made thereto without departing from the spirit and scope of the invention as defined in the following claims.

I claim:

1. A reservoir container assembly for growing plants with a small amount of water, comprising:
   a reservoir container means comprising a bottom, a sidewall, and an open top, the open top being disposed upwardly when the reservoir container is in use, the reservoir container means having a water permeable partition which separates the reservoir container means into a first volume and a second volume, the second volume being bounded on one side by the open top and containing a hydroscopic medium; and
   a bag container means for holding a plant growing medium, the bag container means having a bottom surface which rests on the hydroscopic medium in the second volume when the bag container means is disposed on top of said second volume of said reservoir container means, the bottom surface of the bag container means having perforations so that moisture from the hydroscopic medium can pass into the plant growing medium, the bag container means having at least one plant opening for allowing plant growth therethrough.

2. The reservoir container assembly of claim 1, wherein the bag container means has an evaporation opening disposed remote from said at least one plant opening for allowing evaporation of water therethrough.

3. The reservoir container assembly of claim 1, wherein said sidewall of the reservoir container means has a drain hole so that standing water in excess of a predetermined volume will drain out of the reservoir container through said drain hole when the reservoir container means is disposed for use.

4. The reservoir container assembly of claim 3, wherein said first volume of said reservoir container means is substantially devoid of said hydroscopic medium, wherein said drain hole leads into said first volume, and wherein standing water contacts said water permeable partition when standing water is in said reservoir means.

5. The reservoir container assembly of claim 2, wherein said bag container means has a top surface opposite said bottom surface and wherein said bag container means has two plant openings, said plant openings being oriented on said top surface such that said evaporation opening is between said plant openings and said plant openings are substantially equidistant from said evaporation opening.

6. The reservoir container assembly of claim 2, wherein said bag container means is a flexible plastic bag made of water impervious material.

7. The reservoir container assembly of claim 6, wherein said water impervious material is polyethylene.

8. The reservoir container assembly of claim 5, wherein said hydroscopic material is sand.

9. The reservoir container assembly of claim 5, wherein said hydroscopic material is rock wool.

10. The reservoir container assembly of claim 1, wherein said reservoir container means is provided with means for supplying water thereto.

11. The reservoir container assembly of claim 1, wherein said bag container means has opposite ends and wherein said bag container means has two plant openings, one plant opening being disposed adjacent one end of the bag container means, the other plant opening being disposed adjacent the other opposite end.

12. The reservoir container assembly of claim 2, wherein said evaporation opening is larger than said at least one plant opening.

13. The reservoir container assembly of claim 1, wherein said at least one plant opening in said bag container means has a flexible peripheral edge which remains in contact with a plant stem grown through said at least one plant opening.

14. A reservoir container assembly for growing plants comprising first container means for holding a liquid and having a wall, second container means for holding a plant growing medium, conduit means extending from the interior of said first container means through said wall into the interior of said second container means, said conduit means having means for assisting the transfer of liquid from said first to said second container means, said second container means having a surface portion that, in use, faces substantially vertically upwardly and a first opening in said surface portion for allowing plant growth therethrough, said second container means also having a second opening disposed remote from said first opening and for allowing evaporation of liquid therethrough.

15. The invention as claimed in claim 14, wherein said wall of said first container means extends substantially horizontally in use and said second container means has another surface portion surface disposed on said wall with said conduit means extending through said another surface portion.

16. The invention as claimed in claim 15, wherein said second container means is a flexible bag of water impervious material.

17. The invention as claimed in claim 16, wherein said material is polyethylene.

18. The invention as claimed in claim 15, wherein said conduit means is a tube having opposite open ends.

19. The invention as claimed in claim 18, wherein said means for assisting is a hydroscopic medium disposed in said tube.

20. The invention as claimed in claim 19, wherein said hydroscopic medium is sand.

21. The invention as claimed in claim 19, wherein said hydroscopic medium is rock wool.

22. The invention as claimed in claim 14, wherein said first container means is provided with means for supplying water thereto.

23. The invention as claimed in claim 14, wherein said second container means has opposite ends and said first opening is disposed adjacent one end thereof and said second opening is disposed adjacent said opposite end.

24. The invention as claimed in claim 15, wherein said wall of said first container means extends substantially horizontally in use and is provided with a plurality of perforations therein and said another surface portion of said second container means is provided with a plurality of perforations therein and said another surface portion of said second container means is disposed on said wall of said first container means.

25. The invention as claimed in claim 14, wherein said second opening in said second container means is larger than said first opening.

26. The invention as claimed in claim 14, wherein the size of said first opening is sufficient to allow growth of a plant therethrough.

27. The invention as claimed in claim 14, wherein said first opening in said second container has a flexible peripheral edge and has a size where said edge remains in contact with a plant stem grown therethrough.

28. The invention as claimed in claim 14, wherein said second container means has a longitudinal axis and said surface portion extends generally parallel to said longitudinal axis, and a third opening is provided in said surface portion for allowing plant growth therethrough and which is spaced from said second opening.

29. The invention as claimed in claim 28, wherein said first and third openings in said surface portion are spaced generally equidistantly from said second opening along said longitudinal axis.

30. The invention as claimed in claim 14, wherein said second container means has end walls extending from said surface portion and at least a portion of one of said end walls includes said second opening.

31. The invention as claimed in claim 30, wherein said second opening includes a screen barrier for retaining the growing medium in said second container means.

32. The invention as claimed in claim 14, wherein said second opening is provided with screen means for retaining growing medium in said second container means.

33. The invention as claimed in claim 32, wherein said second means is formed to define a receptacle inwardly of said second opening in said second container means.

* * * * *